United States Patent
Kinai et al.

(10) Patent No.: US 12,073,369 B2
(45) Date of Patent: Aug. 27, 2024

(54) SPATIO-TEMPORAL CALENDAR GENERATION

(71) Applicant: International Business Machines Corporation, Armonk, NY (US)

(72) Inventors: Andrew Kinai, Nairobi (KE); Navin Twarakavi, Karnataka (IN); Fred Ochieng Otieno, Nairobi (KE); Kamal Chandra Das, New Delhi (IN); Shantanu R. Godbole, Bangalore (IN); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 17/203,585

(22) Filed: Mar. 16, 2021

(65) Prior Publication Data

US 2022/0300909 A1    Sep. 22, 2022

(51) Int. Cl.
*G06Q 10/1093*    (2023.01)
*G06N 5/04*    (2023.01)
*G06N 20/00*    (2019.01)

(52) U.S. Cl.
CPC .......... *G06Q 10/1095* (2013.01); *G06N 5/04* (2013.01); *G06N 20/00* (2019.01)

(58) Field of Classification Search
CPC ...... G06Q 10/1095; G06N 5/04; G06N 20/00; Y02A 90/10
See application file for complete search history.

(56) References Cited

U.S. PATENT DOCUMENTS

| | | | |
|---|---|---|---|
| 10,169,742 B2* | 1/2019 | Yu | G06Q 10/1095 |
| 2013/0231858 A1* | 9/2013 | Bourne | G01C 21/3407 |
| | | | 701/439 |
| 2014/0278654 A1* | 9/2014 | Candas | G06Q 10/047 |
| | | | 705/7.17 |
| 2017/0276493 A1* | 9/2017 | Bourne | G06Q 50/01 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

*Primary Examiner* — Dylan C White
(74) *Attorney, Agent, or Firm* — Jared C. Chaney

(57) ABSTRACT

A system, computer program product, and method are presented for forecasting a spatio-temporal calendar including predicted regions of interest based on time dependent factors such as long-term weather predictions, time-independent factors, and travel constraints. The method includes collecting information and constraints with respect to service visits. At least a portion of the collected information and constraints are directed toward weather and climate. The method also includes predicting weather and climate impacts on at least one geographical region of interest. The method further includes predicting, subject to the predictions of weather and climate impacts, one or more locations of interest within the at least one geographical region of interest that would be impacted by one or more service visits. The method also includes generating one or more spatio-temporal calendars that include the one or more locations of interest scheduled for the one or more service visits.

20 Claims, 9 Drawing Sheets

(56) References Cited

U.S. PATENT DOCUMENTS

| | | | |
|---|---|---|---|
| 2019/0057311 A1* | 2/2019 | Newell | G06N 5/025 |
| 2020/0149909 A1 | 5/2020 | Beaurepaire | |
| 2020/0210921 A1* | 7/2020 | Gibrekhterman | G06Q 10/20 |
| 2020/0211305 A1* | 7/2020 | Bender | G06N 5/02 |
| 2020/0258052 A1* | 8/2020 | Goyal | G01C 21/3492 |
| 2020/0383284 A1* | 12/2020 | Larsen | G06Q 50/02 |
| 2023/0179955 A1* | 6/2023 | Williams | A61B 5/4833 |
| | | | 455/456.1 |
| 2023/0334366 A1* | 10/2023 | Jeffery | G06Q 30/0202 |

* cited by examiner

SPATIO-TEMPORAL CALENDAR GENERATION

BACKGROUND

The present disclosure relates to spatio-temporal calendar generation, and, more specifically, to forecasting a spatio-temporal calendar including predicted regions of interest based on time dependent factors such as long-term weather predictions, time-independent factors, and travel constraints.

There is a large number of service support organizations across the globe, for example, and without limitation, businesses such as food supply chains, green energy suppliers, utilities, and environmental monitoring services, as well as governmental organizations, that often need to manage assets and clientele spread across large spatial regions. Many known methods to provide support to certain geographic locations at particular times typically rely on individuals, e.g., field professionals and service representatives, to use personal preferences and experiences to schedule support visits through manually maintaining their personal schedule substantially based on predetermined or known requirements. Many support personnel have regions of coverage that extend over pre-determined geographic areas and rely on a routine schedule that is largely self-managed, e.g., visiting each site within the established geographic region approximately once-per-week.

At least some known calendar and scheduling applications include features that predict imminent demand for on-site services based on historical and current data as well as current weather conditions to aid in scheduling service visits. Specifically, calendars for a set of field professionals based on a predicted demand for on-site services and locations associated with a set of requests are available. In addition, some known calendar applications facilitate generating weather predictions and environmental conditions for locations where the field professional needs to travel over the respective visitation time periods. Moreover, some known calendar applications facilitate generating predictions that the field professional will not be able reach a customer at a scheduled time based on the predicted weather and reassigning another field professional to fulfill the service request.

SUMMARY

A system, computer program product, and method are provided for forecasting a spatio-temporal calendar including predicted regions of interest based on time dependent factors such as long-term weather predictions, time-independent factors, and travel constraints.

In one aspect, a computer system is provided for forecasting a spatio-temporal calendar including predicted regions of interest based on time dependent factors such as long-term weather predictions, time-independent factors, and travel constraints. The system includes one or more processing devices and at least one memory device operably coupled to the one or more processing devices. The one or more processing devices are configured to collect information and constraints with respect to service visits. At least a portion of the collected information and constraints are directed toward weather and climate. The one or more processing devices are also configured to predict weather and climate impacts on at least one geographical region of interest. The one or more processing devices are further configured to predict, subject to the predictions of weather and climate impacts, one or more locations of interest within the at least one geographical region of interest that would be impacted by one or more service visits. The one or more processing devices are also configured to generate one or more spatio-temporal calendars that include the one or more locations of interest scheduled for the one or more service visits.

In another aspect, a computer program product is provided for forecasting a spatio-temporal calendar including predicted regions of interest based on time dependent factors such as long-term weather predictions, time-independent factors, and travel constraints. The computer program product includes one or more computer readable storage media, and program instructions collectively stored on the one or more computer storage media. The product also includes program instructions to collect information and constraints with respect to service visits. At least a portion of the collected information and constraints are directed toward weather and climate. The product further includes program instructions to predict weather and climate impacts on at least one geographical region of interest. The product also includes program instructions to predict, subject to the predictions of weather and climate impacts, one or more locations of interest within the at least one geographical region of interest that would be impacted by one or more service visits. The product further includes program instructions to generate one or more spatio-temporal calendars that include the one or more locations of interest scheduled for the one or more service visits.

In yet another aspect, a computer-implemented method is provided for forecasting a spatio-temporal calendar including predicted regions of interest based on time dependent factors such as long-term weather predictions, time-independent factors, and travel constraints. The method includes collecting information and constraints with respect to service visits. At least a portion of the collected information and constraints are directed toward weather and climate. The method also includes predicting weather and climate impacts on at least one geographical region of interest. The method further includes predicting, subject to the predictions of weather and climate impacts, one or more locations of interest within the at least one geographical region of interest that would be impacted by one or more service visits. The method also includes generating one or more spatio-temporal calendars that include the one or more locations of interest scheduled for the one or more service visits.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
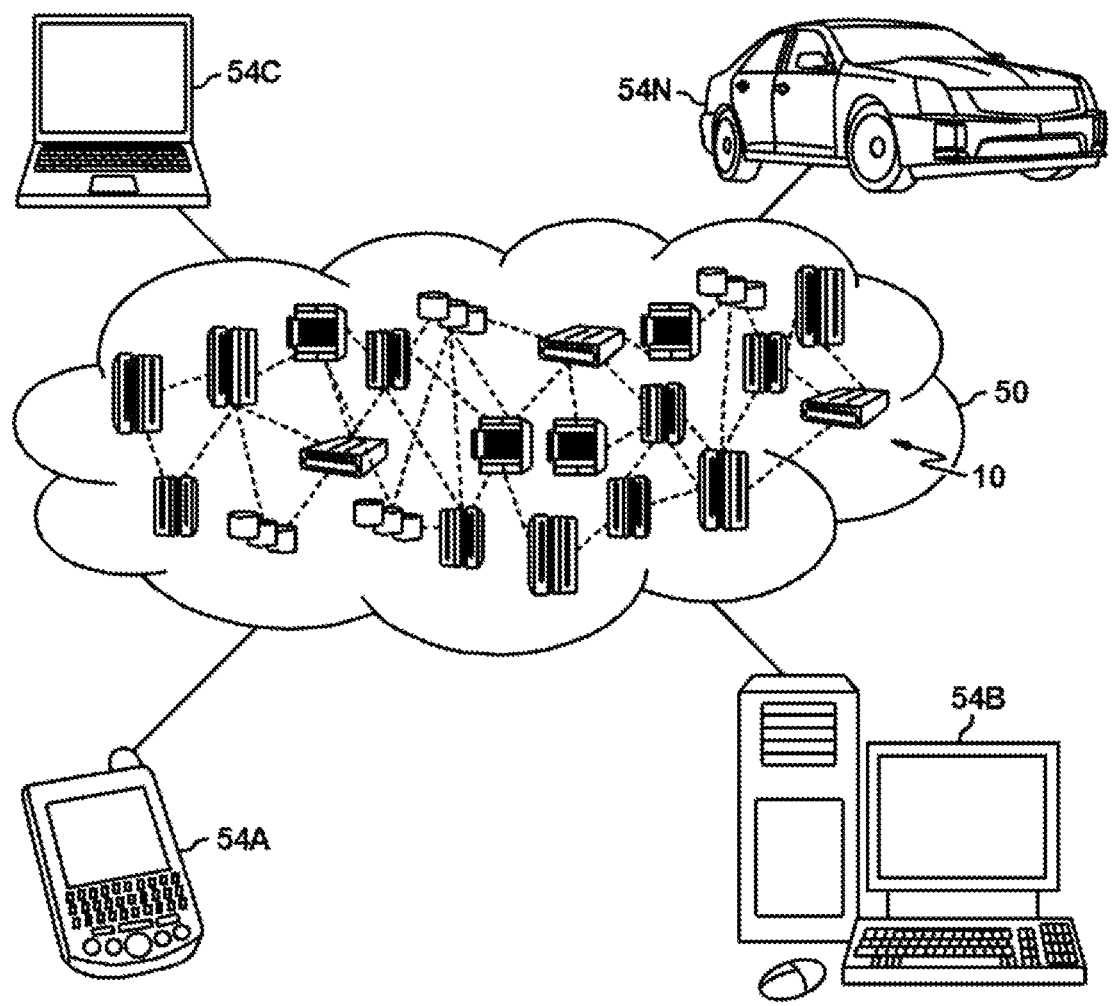
FIG. 1 is a schematic diagram illustrating a cloud computer environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments. In addition, it will be appreciated that, although specific embodiments have been described herein for purposes of illustration, various modifications may be made without departing from the spirit and scope of the embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
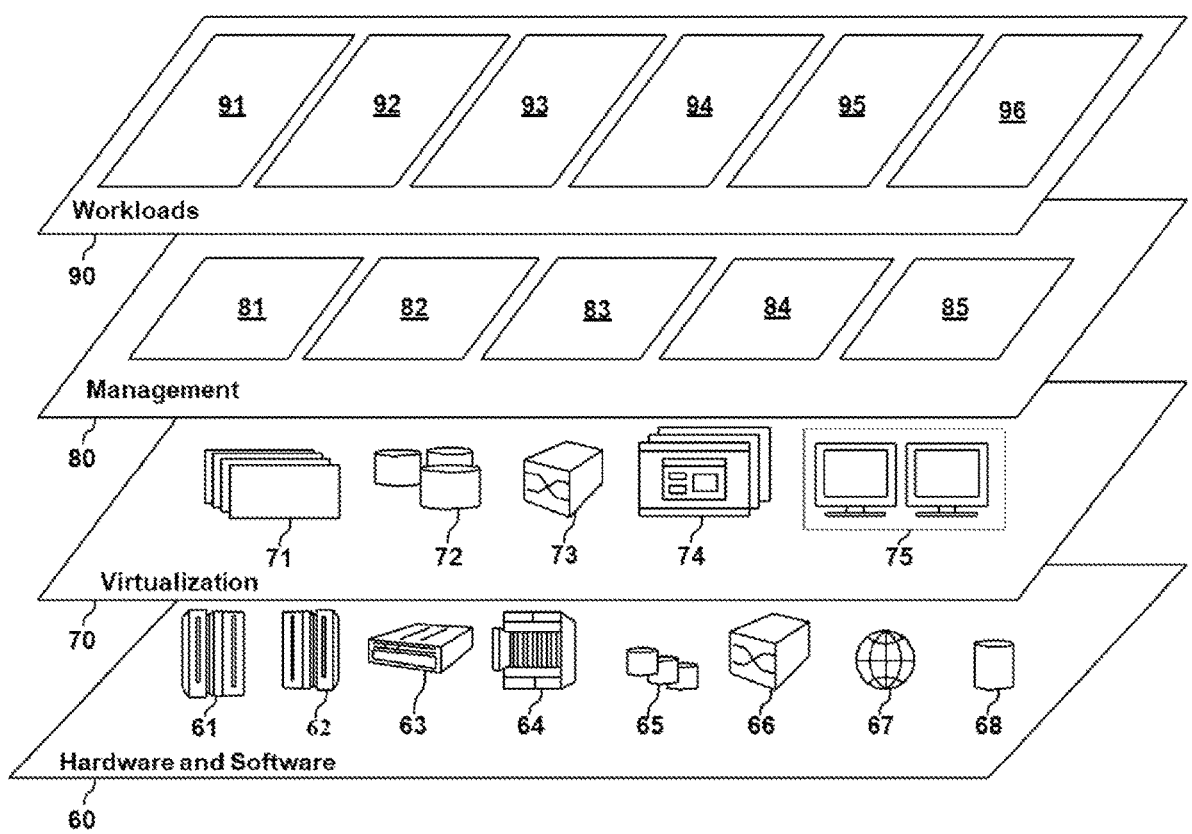
FIG. 2 is a block diagram illustrating a set of functional abstraction model layers provided by the cloud computing environment, in accordance with some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and to forecasting a spatio-temporal calendar including predicted regions of interest 96.

Figure 3:
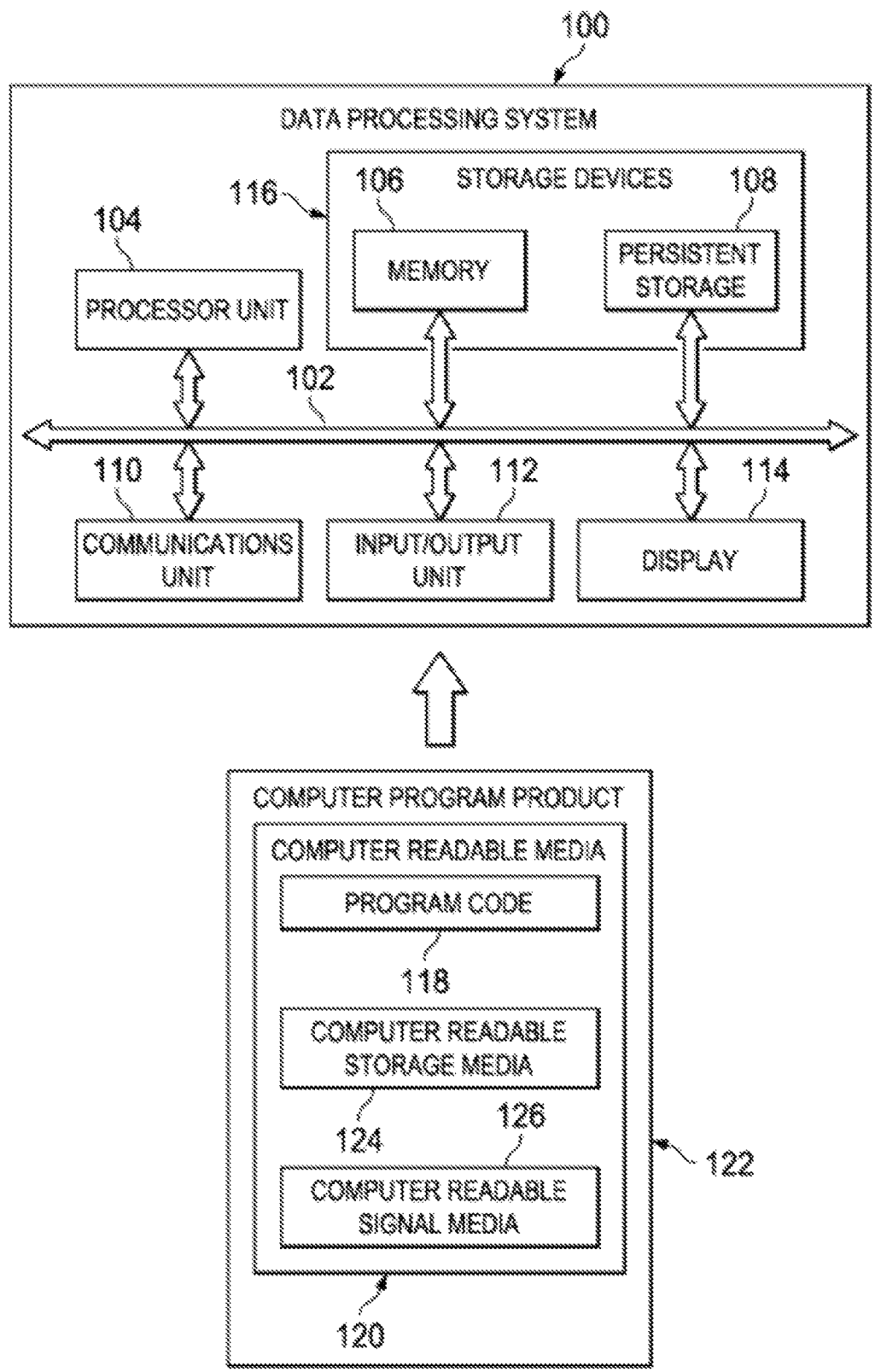
FIG. 3 is a block diagram illustrating a computer system/server that may be used as a cloud-based support system, to implement the processes described herein, in accordance with some embodiments of the present disclosure.

Referring to FIG. 3, a block diagram of an example data processing system, herein referred to as computer system 100, is provided. System 100 may be embodied in a computer system/server in a single location, or in at least one embodiment, may be configured in a cloud-based system sharing computing resources. For example, and without limitation, the computer system 100 may be used as a cloud computing node 10.

Aspects of the computer system 100 may be embodied in a computer system/server in a single location, or in at least one embodiment, may be configured in a cloud-based system sharing computing resources as a cloud-based support system, to implement the system, tools, and processes described herein. The computer system 100 is operational with numerous other general purpose or special purpose computer system environments or configurations. Examples of well-known computer systems, environments, and/or configurations that may be suitable for use with the computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computer system 100 may be described in the general context of computer system-executable instructions, such as program modules, being executed by the computer system 100. Generally, program modules may include routines, programs, objects, components, logic, data structures, and so on that perform particular tasks or implement particular abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 is shown in the form of a general-purpose computing device. The components of the computer system 100 may include, but are not limited to, one or more processors or processing devices 104 (sometimes referred to as processors and processing units), e.g., hardware processors, a system memory 106 (sometimes referred to as a memory device), and a communications bus 102 that couples various system components including the system memory 106 to the processing device 104. The communications bus 102 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 100 typically includes a variety of computer system readable media. Such media may be any available media that is accessible by the computer system 100 and it includes both volatile and non-volatile media, removable and non-removable media. In addition, the computer system 100 may include one or more persistent storage devices 108, communications units 110, input/output (I/O) units 112, and displays 114.

The processing device 104 serves to execute instructions for software that may be loaded into the system memory 106. The processing device 104 may be a number of processors, a multi-core processor, or some other type of processor, depending on the particular implementation. A number, as used herein with reference to an item, means one or more items. Further, the processing device 104 may be implemented using a number of heterogeneous processor systems in which a main processor is present with secondary processors on a single chip. As another illustrative example, the processing device 104 may be a symmetric multiprocessor system containing multiple processors of the same type.

The system memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The system memory 106, in these examples, may be, for example, a random access memory or any other suitable volatile or non-volatile storage device. The system memory 106 can include computer system readable media in the form of volatile memory, such as random access memory (RAM) and/or cache memory.

The persistent storage 108 may take various forms depending on the particular implementation. For example, the persistent storage 108 may contain one or more components or devices. For example, and without limitation, the persistent storage 108 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the communication bus 102 by one or more data media interfaces.

The communications unit 110 in these examples may provide for communications with other computer systems or devices. In these examples, the communications unit 110 is a network interface card. The communications unit 110 may provide communications through the use of either or both physical and wireless communications links.

The input/output unit 112 may allow for input and output of data with other devices that may be connected to the computer system 100. For example, the input/output unit 112 may provide a connection for user input through a keyboard, a mouse, and/or some other suitable input device. Further, the input/output unit 112 may send output to a printer. The display 114 may provide a mechanism to display information to a user. Examples of the input/output units 112 that facilitate establishing communications between a variety of devices within the computer system 100 include, without limitation, network cards, modems, and input/output interface cards. In addition, the computer system 100 can communicate with one or more networks such as a local area network (LAN), a general wide area network (WAN), and/or a public network (e.g., the Internet) via a network adapter (not shown in FIG. 3). It should be understood that although not shown, other hardware and/or software components could be used in conjunction with the computer system 100. Examples of such components include, but are not limited to: microcode, device drivers, redundant processing units, external disk drive arrays, RAID systems, tape drives, and data archival storage systems.

Instructions for the operating system, applications and/or programs may be located in the storage devices 116, which are in communication with the processing device 104 through the communications bus 102. In these illustrative examples, the instructions are in a functional form on the persistent storage 108. These instructions may be loaded into the system memory 106 for execution by the processing device 104. The processes of the different embodiments may be performed by the processing device 104 using computer implemented instructions, which may be located in a memory, such as the system memory 106. These instructions are referred to as program code, computer usable program code, or computer readable program code that may be read and executed by a processor in the processing device 104. The program code in the different embodiments may be embodied on different physical or tangible computer readable media, such as the system memory 106 or the persistent storage 108.

The program code 118 may be located in a functional form on the computer readable media 120 that is selectively removable and may be loaded onto or transferred to the computer system 100 for execution by the processing device 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the computer system 100. In some instances, the computer readable storage media 124 may not be removable from the computer system 100.

Alternatively, the program code 118 may be transferred to the computer system 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or computer system through the computer readable signal media 126 for use within the computer system 100. For instance, program code stored in a computer readable storage medium in a server computer system may be downloaded over a network from the server to the computer system 100. The computer system providing the program code 118 may be a server computer, a client computer, or some other device capable of storing and transmitting the program code 118.

The program code 118 may include one or more program modules (not shown in FIG. 3) that may be stored in system memory 106 by way of example, and not limitation, as well as an operating system, one or more application programs, other program modules, and program data. Each of the operating systems, one or more application programs, other program modules, and program data or some combination thereof, may include an implementation of a networking environment. The program modules of the program code 118 generally carry out the functions and/or methodologies of embodiments as described herein.

The different components illustrated for the computer system 100 are not meant to provide architectural limitations to the manner in which different embodiments may be implemented. The different illustrative embodiments may be implemented in a computer system including components in addition to or in place of those illustrated for the computer system 100.

The present disclosure may be a system, a method, and/or a computer program product at any possible technical detail level of integration. The computer program product may include a computer readable storage medium (or media) having computer readable program instructions therein for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded therein, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

There is a large number of service support organizations across the globe, for example, and without limitation, businesses such as food supply chains, green energy suppliers, utilities, and environmental monitoring services, as well as governmental organizations, that often need to manage assets and clientele spread across large spatial regions. Many known methods to provide support to certain geographic locations at particular times typically rely on individuals, e.g., field professionals and service representatives, to use personal preferences and experiences to schedule support visits through manually maintaining their personal schedule substantially based on predetermined or known requirements. Many support personnel have regions of coverage that extend over pre-determined geographic areas and rely on a routine schedule that is largely self-managed, e.g., visiting each site within the established geographic region approximately once-per-week.

Many known methods to provide support to certain geographic locations at particular times require particular individuals to use personal preferences and experiences to schedule support visits through manually maintaining their personal schedule substantially based on predetermined or known requirements. Many support personnel have regions of coverage that extend over pre-determined geographic areas and rely on a routine schedule that is largely self-managed, e.g., visiting each site within the established geographic region approximately once-per-week. At least a portion of the site visits may not be necessary at the respective points in time. Also, if the number of locations to visit increases, the choice of such locations and the time of the scheduled site visits based on personal preferences and experiences. Accordingly, in at least some cases of support, the site visits are not planned for optimization of limited human resources (i.e., being in the right place at the right time), where such spatio-temporal optimization is often dependent upon the nature of, and veracity of, forecasted needs for services across the various times and locations.

At least a portion of the respective assets and clientele have requirements that are influenced by the weather. For example, agricultural business entities and farmers may require an in-person visit from an agricultural service representative in a particular area during particular weather-related events to assess the conditions and recommend products to optimize produce yields. However, the respective weather conditions may have passed by the time a service representative arrives on a routine visit, thereby possibly subjecting the respective business entity with a lost sales opportunity and the farmers an opportunity to address the weather conditions.

A further example includes downstream procurement of agricultural produce that often depends on the yields by the farmers, including predicted yields. Service representatives of food procurement businesses need to plan their procurement activities to ensure meeting procurement targets and such activities are often determined through calculated timing for initiating procurement activities and the identifying procurement locations for the respective growing season. In addition, for governmental organizations, the weather influences the effectiveness of agents in providing services for farmers and other workers, including agricultural and industrial, delivered health care, agricultural support, technical support, and financial support. Furthermore, many known renewable energy generation sites, e.g., solar energy and wind farms, include physical assets that require visitation by technicians and engineers with known periodicities, where such visitations may be best served if the weather and environmental conditions are conducive to site shutdowns or sites in operation.

At least some known calendar and scheduling applications (herein "scheduling applications") include features that predict imminent demand for on-site services based on historical and current data as well as current weather conditions to aid in scheduling service visits. Specifically, schedules for a set of field professionals based on a predicted demand for on-site services and locations associated with a set of requests are available. In addition, some known scheduling applications facilitate generating weather predictions and environmental conditions for locations where the field professional needs to travel over the respective visitation time periods. Moreover, some known scheduling applications facilitate generating predictions that the field professional will not be able reach a customer at a scheduled time based on the predicted weather and reassigning another field professional to fulfill the service request.

Many of these known scheduling systems, methods, and applications do not employ optimizing features that will maximize the productivity of the human resources with respect to timely and essential resource allocation to the respective sites. More specifically, many of these known scheduling systems, methods, and applications do not employ automated systematic approaches such that the respective human resources may plan their schedules for optimal service delivery and "customer" engagement. In addition, many such known scheduling tools do not include features for dynamically determining and predicting the sites of interest where a service provider needs to travel for a specified duration of time. Moreover, there are no measurement mechanisms to facilitate determination of one or more impact metrics to measure the effectiveness of the known scheduling tools for a user or group of users. Furthermore, such known scheduling tools do not use intelligent generation of questions, topics, and subjects of interest while considering spatio-temporal properties such as location, time, business considerations, and predicted or actual customer needs, while maximizing user engagement.

A system, computer program product, and method are disclosed and described herein for predicting spatio-temporal properties of forecasted services across temporal and geographical dimensions. As described further herein, the systems and methods creating a spatio-temporal calendar for a user or group of users in a resource constrained environment by predicting the region of interest and locations where the user (service provider) needs to travel for a specified duration of time. In at least some embodiments, the systems and methods described herein leverage a hybrid approach that includes both process-based and machine learning features to dynamically determine and predict the regions of interest and more precise locations where a user (service provider) needs to travel for a specified duration of time.

In some embodiments, the systems and methods described herein facilitate calendar and schedule generation in situations where the volume of the potential locations to be visited are orders of magnitude greater than the capacity of the available service providers and, therefore, take into account the uncertainties introduced through the effectiveness of actions taken by the service providers in time, space, and seasonal weather variants. In some embodiments, for example, a seasonal forecast may be an input for ingestion into the one or more models. Further in some embodiments, an ingesting by the one or more machine learning algorithms of seasonal-scale weather forecasts (e.g., and without limitation, 0-12 months) facilitates predicting the location of the region of interest for one or more service providers, including locations where no previous incentive to visit was presented to the user or group of users.

For example, and without limitation, in some embodiments, the systems and methods described herein forecast a spatio-temporal calendar using the expected impact of time-dependent factors such as weather, time-independent factors such as geographical constraints, and travel constraints for a user or group of users. Also, the systems and methods described herein are configured to create location-service specific subjects of interest for a user to engage their clientele with, as s/he travels to a location based on the forecasted spatio-temporal calendar schedule. In addition, the systems disclosed herein monitor ongoing and predicted spatio-temporal events associated with each location to determine the necessary requirements and resources and update the spatio-temporal calendar and schedules appropriately. Accordingly, the systems and methods described herein optimize resource allocation while managing spatio-temporal calendar schedules.

Further, in some embodiments, for example, the systems and methods described herein generate questions and/or identify subjects of interest based on location and time to enhance engagement with the clientele. Therefore, the one or more machine learning models are trained to generate such questions and topics/subjects of interest while considering the respective spatio-temporal properties that include, without limitation, location, time, business considerations, and predicted and actual customer needs, while maximizing user engagement. Moreover, the systems and methods herein are configured to estimate long-term, as well as short-term, support requirements and create an assignment plan that optimizes the available resources. In addition, the systems and methods herein are configured to determine one or more impact metrics to measure the effectiveness of the spatio-temporal calendar for the user or group of users. Also, in embodiments, as the system monitors ongoing and predicted spatio-temporal events of each location, the system is configured to determine the altered requirements and resources and updates the "spatio-temporal" calendar, the respective service agents' schedules, and the impact metrics.

Figure 4:
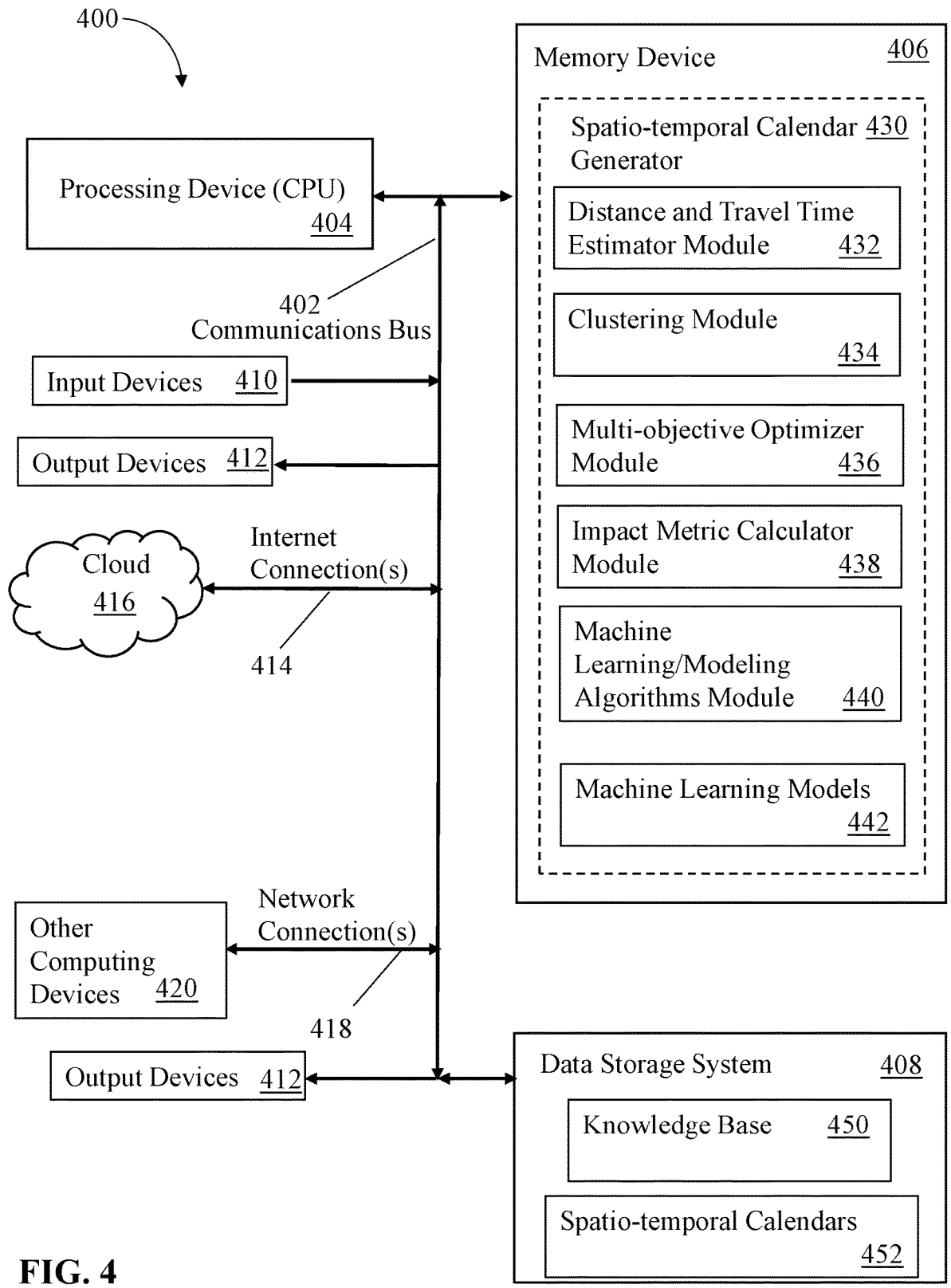
FIG. 4 is a block diagram illustrating a computer system configured for forecasting a spatio-temporal calendar including predicted regions of interest, in accordance with some embodiments of the present disclosure.

Referring to FIG. 4, a block diagram is provided illustrating a computer system, i.e., a spatio-temporal calendar generation system 400 (herein referred to as "the system 400") that is configured for forecasting a spatio-temporal calendar including predicted regions of interest based on time dependent factors such as long-term weather predictions, time-independent factors, and travel constraints. The system 400 includes one or more processing devices 404 (only one shown) communicatively and operably coupled to one or more memory devices 406 (only one shown). The system 400 also includes a data storage system 408 that is communicatively coupled to the processing device 404 and memory device 406 through a communications bus 402. In one or more embodiments, the communications bus 402, the processing device 404, the memory device 406, and the data storage system 408 are similar to their counterparts shown in FIG. 3, i.e., the communications bus 102, the processing device 104, the system memory 106, and the persistent storage devices 108, respectively. The system 400 further includes one or more input devices 410 and one or more output devices 412 communicatively coupled to the communications bus 402. In addition, the system 400 includes one or more Internet connections 414 (only one shown) communicatively coupled to the cloud 416 through the communications bus 402, and one or more network connections 418 (only one shown) communicatively coupled to one or more other computing devices 420 through the communications bus 402. In some embodiments, the Internet connections 414 facilitate communication between the system 400 and one or more cloud-based centralized systems and/or services (not shown in FIG. 4).

In one or more embodiments, a spatio-temporal calendar generator 430, herein referred to as "the generator 430", is resident within the memory device 406 to facilitate forecasting a spatio-temporal calendar including predicted regions of interest based on time dependent factors such as long-term weather predictions, time-independent factors, and travel constraints. The generator 430 includes a distance and travel time estimator module 432, a clustering module 434, a multi-objective optimizer module 436, and an impact metric calculator module 438. The generator 430 also includes a machine learning (ML)/modeling algorithms module 440, herein referred as the "ML module 440," and the machine learning (ML) models 442 generated by the ML module 440 embedded therein. The components of the generator 430 are discussed further with respect to FIGS. 5-10.

In at least some embodiments, the data storage system 408 provides storage to, and without limitation, a knowledge base 450 that includes the data ingested by the ML module 440 to generate the ML models 442 and the data used to facilitate generating the spatio-temporal calendars 452 that are also stored in the data storage system 408.

Figure 5:
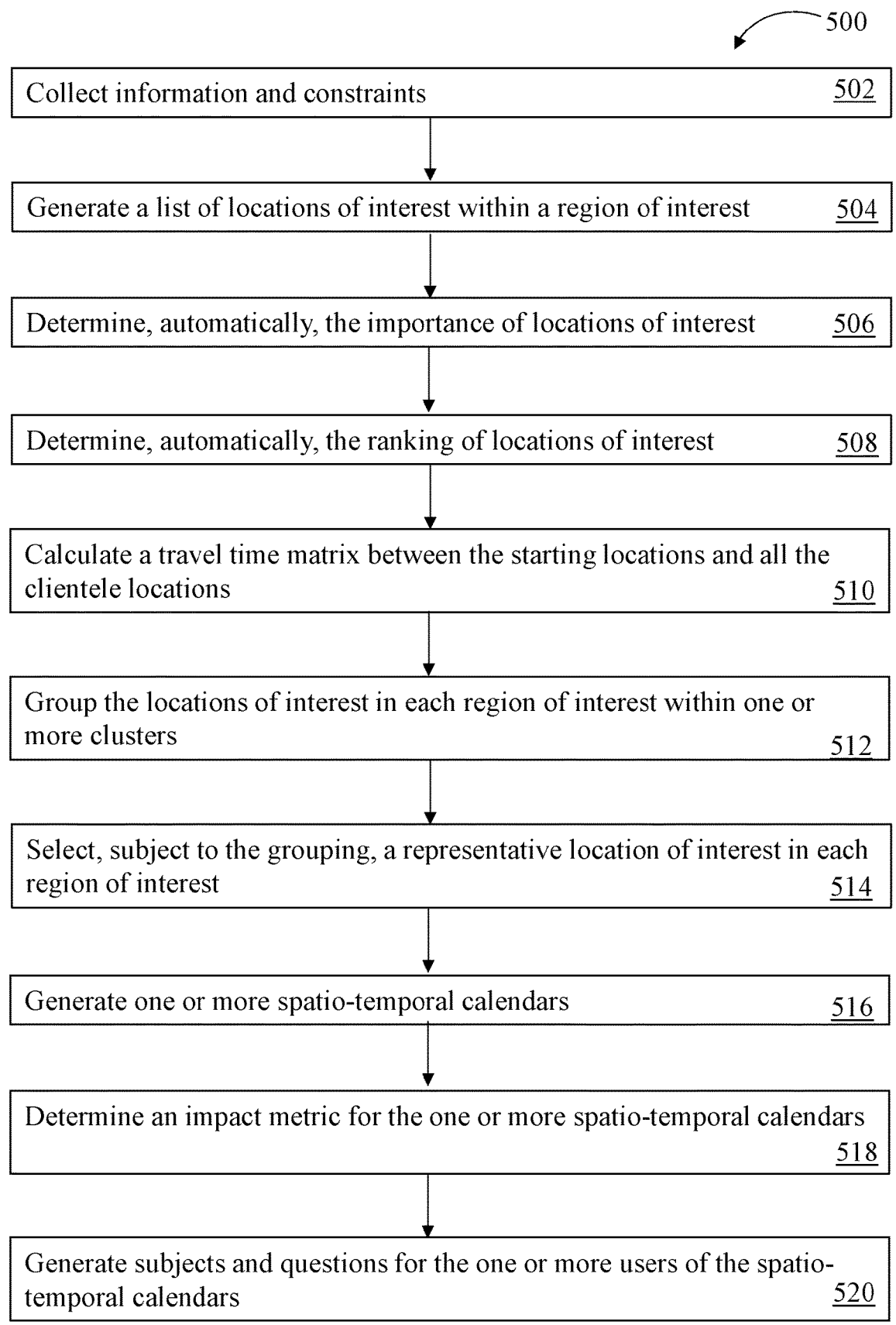
FIG. 5 is a flowchart illustrating a process for generating one or more spatio-temporal calendars for one or more users, in accordance with some embodiments of the present disclosure.

Referring to FIG. 5, a flowchart is provided illustrating a process 500 for generating one or more spatio-temporal calendars for one or more users. More specifically, the process 500 is directed toward a computer-implemented method for generating one or more spatio-temporal calendars for one or more traveling consultants and service-providers, herein referred to as a user and users that are tasked with reaching out to their assigned customers, clientele, and benefactors, herein collectively referred to as clientele, that are spread across a region.

In one or more embodiments, the process 500 includes collecting 502 information and constraints associated with generating a spatio-temporal calendar that is effective and efficient. Also referring to FIG. 6, a block diagram is provided illustrating a portion 600 of the process 500 of FIG. 5 with at least a portion of respective information and constraints 620, the factors 640 and 650, and the importance determination 660 used to execute the process 500 to generate, through the spatio-temporal calendar generator 670 (shown as 430 in FIG. 4), the one or more spatio-temporal calendars 680 (shown as 452 in FIG. 4) for one or more users.

In at least one embodiment, the collecting operation 502 includes determining 602 one or more users' travel constraints 622. Such travel constraints 622 may include, without limitation, starting location, time period for which the spatio-temporal calendar needs to be forecasted, maximum length of trips acceptable before returning to starting location, maximum time or distance (or both) allowed for travel for any given period (day, week, month), allowable risk during travel due to poor road infrastructure, security, or other natural and man-made reasons. Moreover, in embodiments, the collecting operation 502 also includes determining 604 calendar events 624 important to the business, e.g., in agriculture, crop growing calendars that specify when specific crops are grown in various locations. In addition, the collecting operation 502 further includes determining 606 a time-period 626 of the one or more users' calendar (or joint calendar) to be optimized, e.g., and without limitation, next week, or next month. Furthermore, the collecting operation 502 includes determining 608 the types of services 628 intended to be provided. For example, the user may choose crops of interest and problems such as pest and disease management and fertilizing as consulting topics of interest. In some embodiments machine learning technology, e.g., the machine learning/modeling algorithms 440, is used to facilitate determining 606, i.e., predicting, the time period 626, determining 608 (predicting) the types of services 628 to be provided, and determining 610 (predicting) the regions 630 and the locations 632 therein through previous training of the respective machine learning models, e.g., ML models 442, with the information from the knowledge base 714. In some embodiments, the machine learning technology is used to identify, through predictions, the time periods, the type of services, and the regions and locations that were never previously considered by the user.

In one or more embodiments, taking into consideration the determination operations 602 through 608, the process 500 includes generating 504 a list of locations of interest within a region of interest, where the generating operation 504 is further elaborated on as determining 610 one or more regions 630 of interest and one or more particular locations 632 within the identified regions 630. In some embodiments, the determining operation 610 includes a user's governing entity assigning the respective one or more regions 630 and the locations 632 therein. In some embodiments, the one or more regions 630 and the one or more locations 632 are selected by the user based on experience. In some embodiments, the regions 630/locations 632 determination operation 610 includes automatically identifying previously unidentified locations 632 through the processes described further herein, including the use of machine learning technology.

In at least some embodiments, the information and constraints collected 502 as described with respect to the determination operations 602 through 608, and the regions 630/locations 632 determination operation 610 may further include determining 640 time-independent factors. Such time independent factors may include the economic value 642 of the respective location that may enhance the regions 630/locations 632 determination operation 610. For example, determining the economic value 642 of a location may include gauging the value of a clientele's location to the user through satellite imagery or though historical user-clientele engagement records and electronically-received log-records of clientele requesting the user's presence. Moreover, the types of service determination operation 608 may be enhanced through the use of map reviews 644 indicating the type of service interests that may be available to the respective clientele. Furthermore, additional contextual information 646 may include the current state of the clientele's activity as measured through satellite imagery.

Also, in at least some embodiments, the information and constraints collected 502 as described with respect to the determination operations 602 through 608, and the regions 630/locations 632 determination operation 610 may further include determining 650 time-dependent factors. Such time-dependent factors may include, for example, in agricultural embodiments, pest and disease forecasts 652 using tools such as, and without limitation, pest and disease data-driven models. In addition, for agricultural embodiments, the current state of agriculture 654 in the respective region 630 may be ascertained through satellite imagery. In addition, certain business considerations may also include estimating the impact of weather forecasts 656 on the value of consultancy at any given location in the time period 626 of interest, including using the weather forecast 656 for the time period 626 of interest to estimate the probability of weather-related hazards. In some embodiments machine learning technology, e.g., the machine learning/modeling algorithms 440, is used to facilitate predicting the weather forecasts 656 and the impact on the clientele through previous training of the respective machine learning models, e.g., ML models 442, with the information from the knowledge base 450. For example, in some embodiments, one or more seasonal forecasts may be an input to the one or more ML models 442. Further, in some embodiments, an ingesting by the machine learning/modeling algorithms 440 of seasonal-scale weather forecasts (e.g., and without limitation, 0-12 months) facilitates predicting the location of the region of interest for one or more service providers. In some embodiments, the machine learning technology is used to identify, through predictions, potential weather-related impacts on the clientele that were never previously considered by the user.

Figure 6:
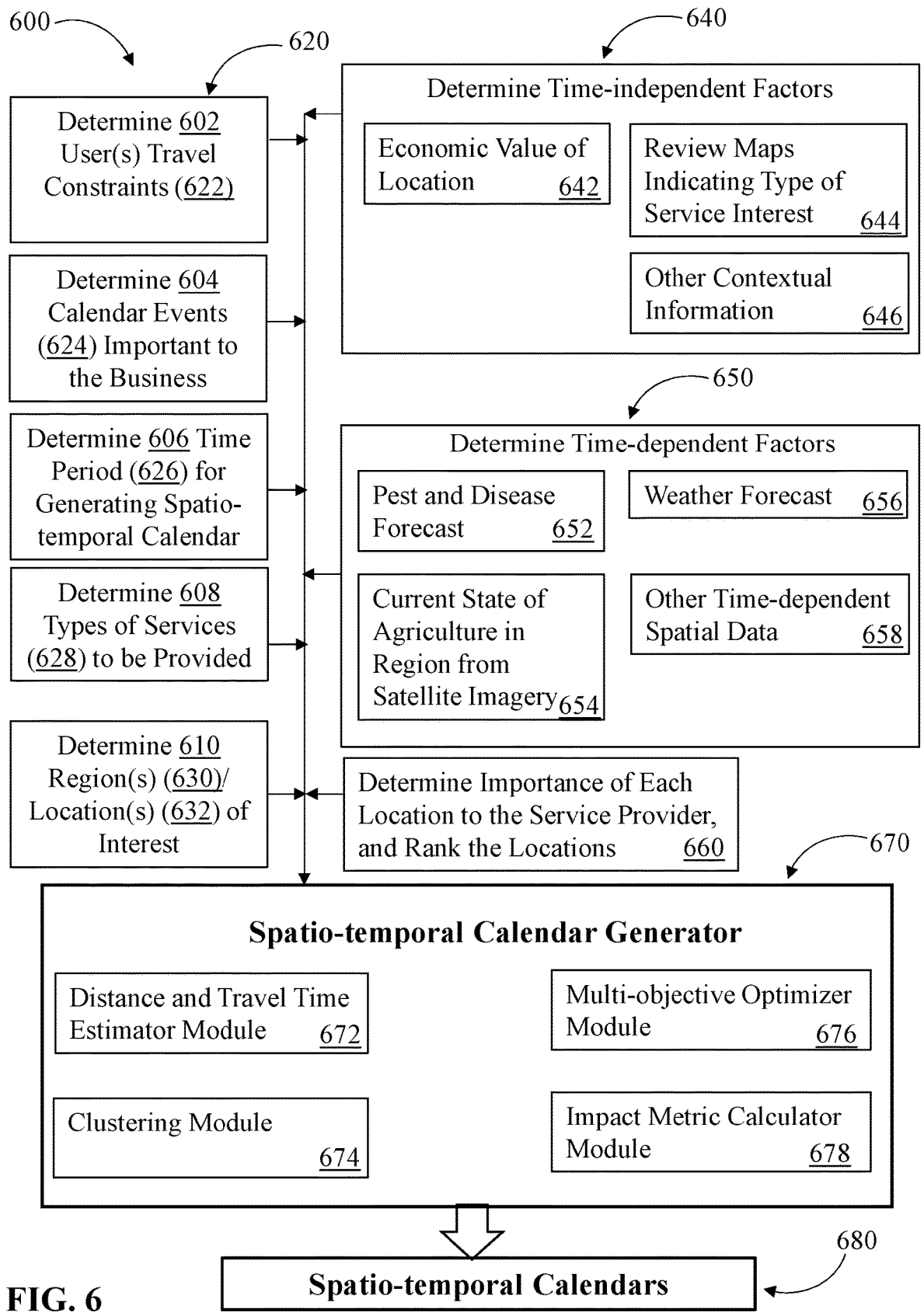
FIG. 6 is a block diagram illustrating a portion of the process of FIG. 5 with at least a portion of respective information and constraints, in accordance with some embodiments of the present disclosure.

In at least some embodiments, the process 500 includes determining 506, automatically, the importance of the locations 632 of interest from point-of-view of business considerations of the service provider for any given day during the time-period 626 of interest. In addition, a ranking of the locations 632 of interest is determined 508 automatically as a function of the importance determination 506. Such determination operations 506 and 508 are combined as shown in FIG. 6 as 660. The determination operation 660 is automatically calculated through using the aforementioned determinations 602 through 610, 640, and 650. The ranking operation 508 of the locations 632 is executed based on their relative importance to the business, including, for example, data such as sales records. In at least some agricultural embodiments, the relative importance of each location 632, e.g., villages, is ranked based on the extent of the respective known agricultural activity. In addition, in some embodiments, the ranking determination 508 may be at least partially influenced through weighting one or more of the previously discussed inputs, such as, and without limitation, the weather forecast 656 for the time period 626 of interest, including the aforementioned estimates of the probability of weather-related hazards. Furthermore, the importance of the locations of interest may be determined at least partially through analyzing any previous engagements with the locations of interest. The data used to generate the determinations 602 through 610, 640, 650, and 660, and the results of the same determinations, may be stored in the knowledge base 450 within the data storage system 408 (both shown in FIG. 4).

In one or more embodiments, a travel time matrix (not shown) is calculated 510 between the previously established starting locations and the determined clientele locations 632. The distance and travel time estimator module 432 (shown as 672 in FIG. 6) embedded within the spatio-temporal calendar generator 430 (shown as 670 in FIG. 6) is configured to consider the travel time between locations as estimated by roadway networks and expected traffic (that may be obtained as other time-dependent spatial data 658). The travel time matrix may be stored in the knowledge base 450 within the data storage system 408 (both shown in FIG. 4).

Also, in some embodiments, the locations 632 of interest to visit in the region 630 of interest are sufficiently numerous such that a single user or a small group of a few users cannot possibly visit each location 632 with a reasonable periodicity that would satisfy the respective clientele. For example, in one or more agricultural embodiments, one or more regions of an emerging nation may have as many as 5,000 villages that desire assistance from the respective service organizations, such assistance best administered in the form of a site visit through a service representative, i.e., a user. For those embodiments where there is only one user assigned to the regions and additional support is not likely, some reasonable mechanism for selection of the locations to visit in the region needs to be employed. In at least some embodiments, one reasonable mechanism is to group portions of the 5,000 villages into clusters that will include at least one representative location that may be scheduled for a service visit by the user. At such a representative location, at least a portion of representatives from the grouped villages may be able to attend a centralized visit to the representative location and the materials presented by the user may propagate through the rest of the villages through word-of-mouth communications. Accordingly, through grouping and clustering, the efficiency of the site visits by the user may be improved.

Figure 7:
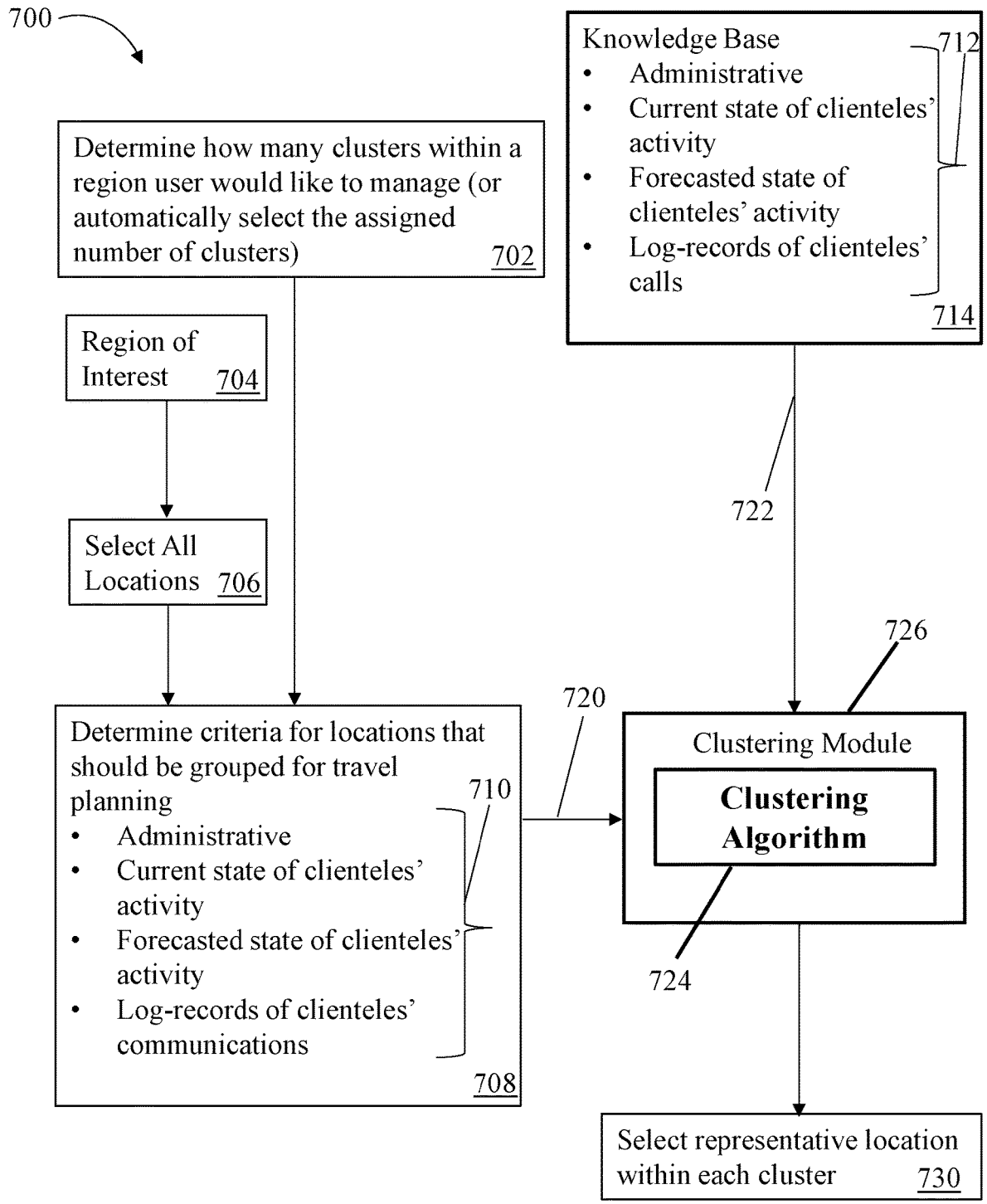
FIG. 7 is a block diagram illustrating a process for grouping locations within a region and selecting a representative location, in accordance with some embodiments of the present disclosure.

In some embodiments, for each given region 630 of interest, locations 632 of interest in the respective regions 630 are grouped 512 to one or more clusters based on geographic, administrative, and/or business considerations for any, or all, the days of interest. Referring to FIG. 7, in the context of FIGS. 5 and 6, a block diagram is provided illustrating a process 700 for grouping 512 locations 632 of interest within a region 630 of interest, clustering the locations 632, and selecting 514 a representative location therefrom. A determination 702 is made with respect to the number of clusters within a region 630 the user would like to manage, where the number of clusters may depend on factors such as, and without limitation, the size of the clusters with respect to both geographical area and number of locations 632 of interest therein, the number of available service personnel as users that can support the region 630 of interest, expected percentages of allotted time to each location 632 of interest, etc. In some embodiments, the cluster assignments are executed automatically. In general, the cluster assignments are relatively static for the long-term.

In at least some embodiments, the region of interest 704 (630 in FIG. 6) is identified and all locations 632 therein are selected 706. The criteria for the locations 632 that should be grouped for travel planning are determined 708. The criteria may be determined 708 from a list of criteria 710 that includes, and without limitation, administrative requirements, the current state of the clienteles' activity (as measured through satellite imagery), the forecasted state of the clienteles' activity, and log-records of the clienteles' communications with the service provider requesting a service visit. In addition, in some embodiments, the criteria may be determined from the determinations illustrated at 602 through 610, 640, 650, and 660, including, without limitation, business considerations including estimating the impact of the weather forecast 656 on the value of consultancy at any given location 632 in the time period 626 of interest and gaging the economic value 642 of a clientele's location to the user. Subject to the criteria determination operation 708, the data 712 associated with the selected criteria is collected from the knowledge base 714 (shown as 450 in FIG. 4) in the data storage system 408 (shown in FIG. 4). The selected criteria 720 and the associated data 722 are transmitted to one or more clustering algorithms 724 within the clustering module 726 (shown as 434 in FIGS. 4 and 674 in FIG. 6). The one or more clustering algorithms 724 group the plurality of locations 632 within the region 630 into clusters based on the aforementioned inputs and selects 730 a representative location within each cluster. In some embodiments, the selection operation 730 of the representative location within the each of the respective clusters includes some level of support from the user to choose the optimum site for a service visit. In some embodiments, machine learning technology, e.g., the machine learning/modeling algorithms 440, is used to facilitate predicting the representative regions and locations therein through previous training of the respective machine learning models, e.g., ML models 442, with the information from the knowledge base 714. In some embodiments, the machine learning technology is used to predict representative locations that were never previously considered by the user. Also, in some embodiments, the clustering algorithm 724 is integrated with the machine learning/modeling algorithms 440 to facilitate the grouping operation 512. Accordingly, the process 700 for grouping and clustering the locations 632 of interest within a region 630 of interest includes determining representative locations 632 within the region 630 when the number of locations 632 to be visited is overwhelming for one or a few service providers.

Referring again to FIG. 5, and continuing to refer to FIGS. 4, 6, and 7, one or more spatio-temporal calendars 680 are generated 516. More specifically, given the constraints and business considerations and the representative locations determined as described with respect to FIGS. 6 and 7, one or more spatio-temporal calendars 680 for the one or more users is generated 516 that minimizes the travelled distance, and in some embodiments, travel time, as well as increases the impact of the users' travels on the clientele being served. The spatio-temporal calendar 680 is configured to inform the user with respect to where to be, and when to be there, as well as how long to stay at each clientele location.

The spatio-temporal calendar generation operation 516 is executed through the multi-objective optimizer module 436 resident within the spatio-temporal calendar generator 430 (both shown in FIG. 4 and identified as 676 and 670, respectively in FIG. 6). In one or more embodiments, one or more multi-objective optimization algorithms resident within the multi-objective optimizer module 676 are executed to generate the spatio-temporal calendar 680 that includes a long-term schedule that facilitates increasing one or more impact factors (discussed further herein) for each day, and reducing one or more of travel time and distance. In general, the impact factors may be predetermined based on known measures of success (or failure) with respect to efficiently using resources to satisfy physically, and possibly culturally and technically, disparate clientele and meeting their needs. Also, in general, the two primary impact factors includes minimal travel and improved business impact. Businesses may measure the effectiveness of the various consultants, or users from causal behaviors and measure the respective performances of the users through respective key performance indicators (KPIs).

In at least some embodiments, two types of multi-objective optimization algorithms may be employed. A first multi-objective optimization algorithm includes a weighted optimization approach that assigns weights to each identified impact factor to signify the relative importance of the respective impact factor. A second Pareto-based optimization algorithm may be used to find one or more non-dominated solutions by simultaneously optimizing the two objectives of minimal travel and improved business impact. In some embodiments, a hybrid of the two multi-objective optimization algorithms may be employed. Accordingly, a solution to the multi-objective problem statement for optimizing both objectives of minimal travel and improved business impact is obtained with the generation operation 516 of the spatio-temporal calendar 680.

In one or more embodiments, the spatio-temporal calendars 680 of each individual user may be aggregated to generate an aggregated view of any portion of the users desired. In addition, the individual and aggregated spatio-temporal calendars 680 are configured for automatically and dynamically updating the individual user and aggregated spatio-temporal calendars 680 in the event there is a change to the input data or constraints used to generate the spatio-temporal calendars 680. For example, and without limitation, in some embodiments, the system 400 may continuously or periodically ingest information associated with the determinations 602 through 610, 640, and 650. In such embodiments, the system 400 also includes the mechanisms to determine if certain data exceeds a threshold value for updating one or more of the determinations 602 through 610, 640, and 650. Upon exceeding the threshold, the updated data is used to update the spatio-temporal calendars 680 accordingly and send notification to the appropriate personnel. In addition, in some embodiments, a change to one spatio-temporal calendar 680 may be cascaded throughout the other spatio-temporal calendars 680 that need to also be updated. Moreover, in at least some embodiments, the dynamic updating features may be extended to updating the relevant spatio-temporal calendars 680 while the respective users are engaged in a scheduled travel period with real-time data, including, without limitation, changes to the prevailing constraints and business needs relevant to the clientele either prior to or during engagement between the users and the clientele.

Also, in some embodiments, the system 400 includes the features necessary to generate or export the spatio-temporal calendars 680 in any format that facilitates electronic sharing. Moreover, in some embodiments, the system 400 includes the necessary features to facilitate communication of the spatio-temporal calendars 680 across multiple electronic devices including, without limitation, phones, laptops, and personal computers through one or more of the network connections 418 and the Internet connections 414 through the cloud 416. Furthermore, in some embodiments, the spatio-temporal calendars 680 may be secured through security features that allow peer-to-peer comparisons in complete-access, restricted- or partial-access, or summary modes.

Figure 8:
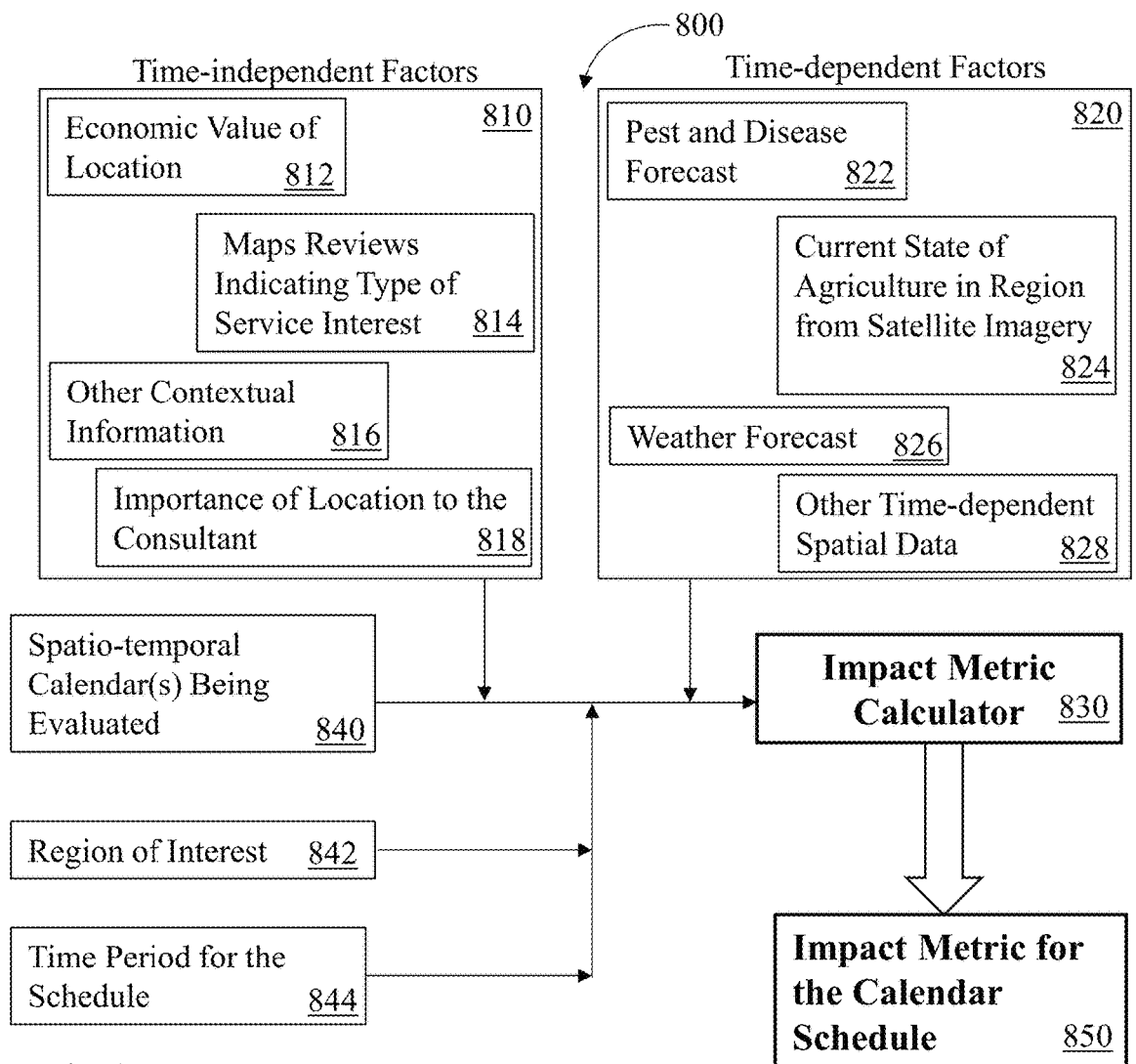
FIG. 8 is a block diagram illustrating a process for computing an impact metric for a user or a team of users, in accordance with some embodiments of the present disclosure.

Referring to FIG. 8, a block diagram is provided illustrating a process 800 for computing an impact score for a user or a team of users. Also, continuing to refer to FIGS. 4, 5, and 6, in one or more embodiments, an impact metric for the one or more spatio-temporal calendars 680 is determined 518 through the impact metric calculator module 678 (shown as 438 in FIG. 4). In some embodiments, the impact metrics facilitates measuring the effectiveness of each user and groups of user in satisfying the needs of clientele and additionally, may be used as a performance indicator/employee evaluation.

In one or more embodiments, the time-independent factors 810 and time-dependent factors 820 are used as inputs to an impact metric calculator 830 that is resident within the impact metric calculator module 678 (shown as 438 in FIG. 4). The time-independent factors 810 include, without limitation, the economic value 812 (shown as 642 in FIG. 6) of the respective location and map reviews 814 (shown as 644 in FIG. 6) indicating the type of service interests that may be available to the respective clientele. The time-independent factors 810 also include additional contextual information 816 (shown as 646 in FIG. 6), e.g., the current state of the clientele's activity as measured through satellite imagery, and the importance of the location to the consultant (user) 818 (shown as 660 in FIG. 6). The time-dependent factors 820 include, without limitation, pest and disease forecasts 822 (shown as 652 in FIG. 6), for agricultural embodiments, the current state of agriculture 824 (shown as 654 in FIG. 6), weather forecasts 826 (shown as 656 in FIG. 6), and other time-dependent spatial data 828 (shown as 658 in FIG. 6). In at least some embodiments, additional inputs into the impact metric calculator 830 include, without limitation, the one or more spatio-temporal calendars being evaluated 840 (shown as 680 in FIG. 6), the region 842 of interest (shown as 630 in FIG. 6), and the time period 844 for the schedule (shown as 626 in FIG. 6).

In one or more embodiments, the impact metric calculator 830 uses one or more algorithms that consider various factors by which the presence of a service provider in a particular regional group can be measured through factors such as, e.g., disease and pest forecasts, crop health, economic value of a location, etc. In some embodiments, the algorithm may include:

$$IM=100\%*[\Sigma_{t=1}^{P}\Sigma_{i=1}^{n}\Sigma_{j=1}^{m}(w_j*V_{i,j,t}*P_{i,t})]/(n*p),$$
where
Equation (1)

the expression $w_j$ is a variable for measuring the relative importance of each factor j from 1 through m factors for the respective businesses. In some embodiments, the factors may include problems facing the clientele that the users may be able to remedy. In some embodiments, the different backgrounds and tasking of the users may result in little overlap of the factors facing each respective user. In some embodiments, a great amount of overlap of the factors may be found, e.g., for agronomists assigned to the same region. The expression $V_{i,j,t}$ is a variable for measuring the forecasted and measured estimates of a factor j on a given day t for a cluster i from i=1 through i=n, where i is representative of the clusters, and in some cases, the clientele. The expression $P_{i,t}$ is a variable representative of the presence or absence of the traveling consultant, i.e., user in a location i, during a time t, where the variable t represents the number of days for the impact evaluation. The expression n*p is representative of the number of clusters multiplied by the number of days. As the impact metric calculator 830 steps through the incrementing values of the factors (j) from 1 through m, the clusters (i) from 1 through n, and the time (t) from 12 through p to create a multitude of impact metrics 850 for the calendar schedules that reside in a matrix structure (not shown). The algorithm represented by Equation 1 may be altered as necessary for capturing the impact scoring for each user or each group of users. Accordingly, a method to objectively evaluate 840 spatio-temporal calendars is used to determine the effectiveness of the users and the schedule.

Figure 9:
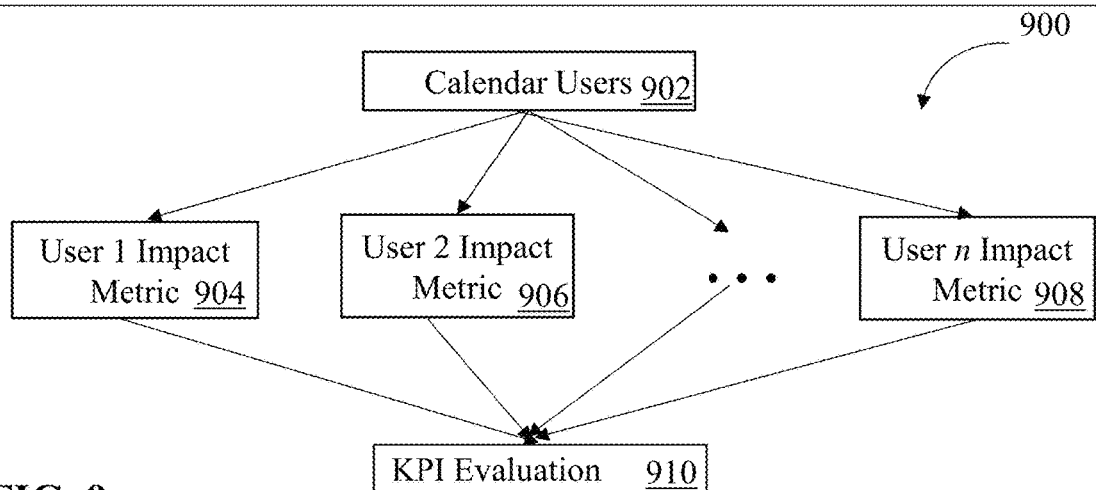
FIG. 9 is a block diagram illustrating a process for executing a key performance indicator (KPI) evaluation for a team of users, in accordance with some embodiments of the present disclosure.

Referring to FIG. 9, a block diagram is provided illustrating a process 900 for executing a key performance indicator (KPI) evaluation for a team of calendar users 902. The process 900 includes capturing an impact metric 904 for a first user, an impact metric 906 for a second user, and an impact metric 908 for an $n^{th}$ user, to determine a KPI evaluation 910. Accordingly, the impact of each user and groups of users may be evaluated to determine the impacts on the KPIs for the respective service organizations.

Figure 10:
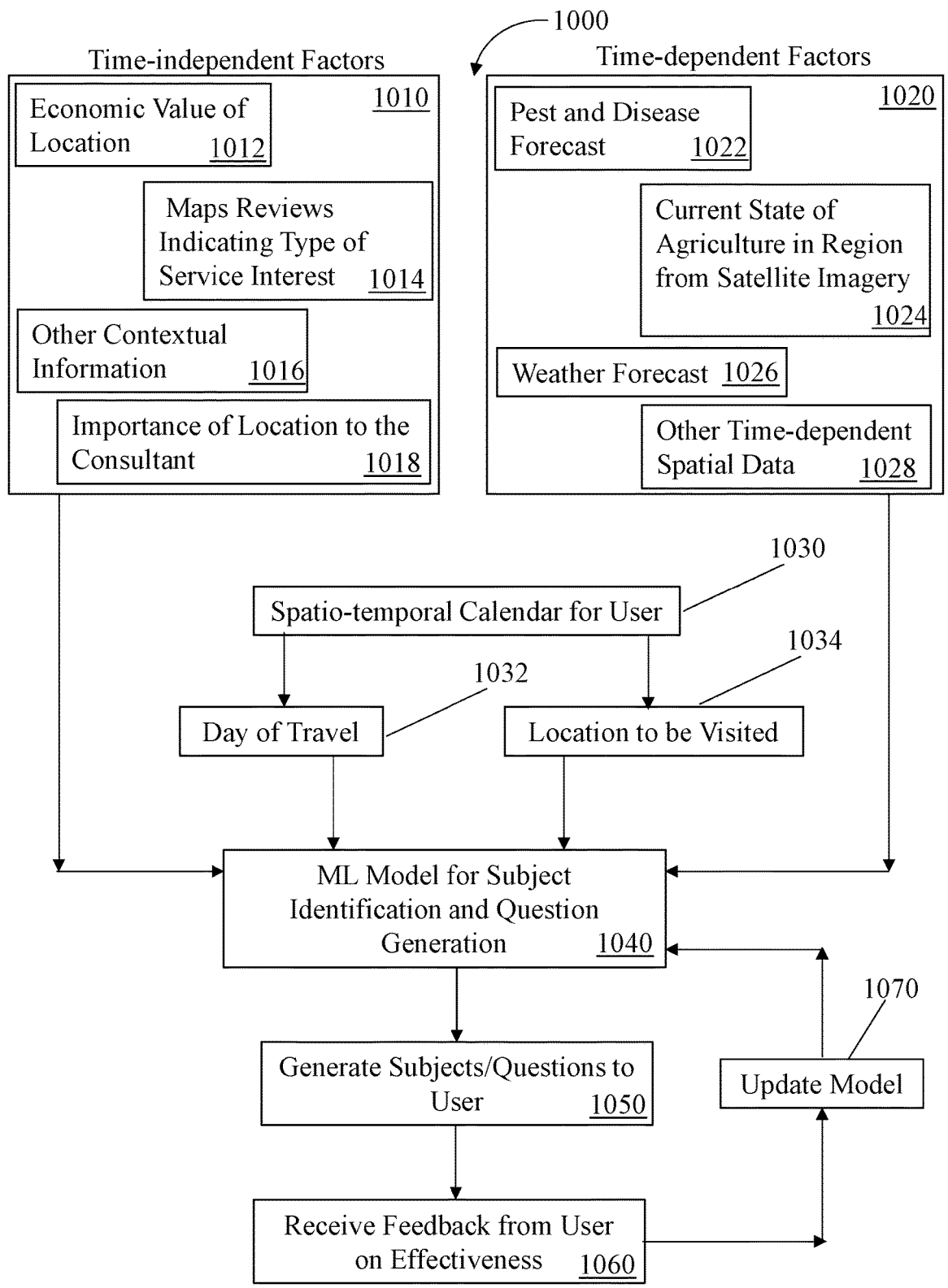
FIG. 10 is a block diagram illustrating a process for generating subjects and questions for the user, in accordance with some embodiments of the present disclosure.

Referring to FIG. 10, a block diagram is provided illustrating a process 1000 for generating subjects and questions for the user. Also referring to FIGS. 4, 5, and 8, at least a portion of the inputs include the time-independent factors 1010 and time-dependent factors 1020 that are substantially similar to the equivalent factors as shown and described with respect to FIG. 8. Therefore, the factors 1012, 1014, 1016, 1018, 1022, 1024, 1026, and 1028 are substantially equivalent to the similar items in FIG. 8. The factors 1010 and 1020 are used to generate 520 subjects and questions for the one or more users of the spatio-temporal calendars 1030. In addition, the respective spatio-temporal calendars 1030 for each user, and more specifically, the scheduled day of travel 1032 and the location to be visited 1034 are used as inputs into the respective ML model 1040 (shown as 442 in FIG. 4). The respective ML model 1040 is configured to generate 1050 questions and raise subjects of interest based on prior training of the ML model 1040 with information such as, and without limitation, based on location, time, business considerations, predicted or actual client needs, and clientele persona, to enhance engagement of the users with the customers and clientele or assisting the users in starting an effective conversation. The ML model 1040 is trained to generate the questions and identify the subjects of interest as an assist to the users that are likely travelling from clientele to clientele, thereby facilitating timely support to the users prior to the interactions with the clientele.

In one or more embodiments, the responses to the subjects and questions from the clientele are collected as receiving 1060 feedback from the users to be used to evaluate the effectiveness of the questions and topics raised during the interactions. The received feedback is ingested into the machine learning/modeling algorithms module 440 for facilitating improvement of the effectiveness of questions generated and topics raised in the future through updating the respective ML model 1040.

As previously described herein, the ML model 1040 may be used to facilitate predicting values for many of the determinations executed as described herein. For example, the ML model 1040 may be trained to predict periods of travel and length of stays at each location, predict the types of services to be provided, predict the grouping in the clusters, and predict the regions and the locations, including those that were never considered by the users. The feedback mechanism shown by the update model operation 1070 may also be used to update the training of the ML model 1040 for the aforementioned predictions.

The system, computer program product, and method as disclosed herein facilitates overcoming the disadvantages and limitations of known systems and methods for forecasting a spatio-temporal calendar including predicted regions of interest based on time dependent factors such as long-term weather predictions, time-independent factors, and travel constraints. In some embodiments, the weather predictions facilitate service visits from service providers based on scheduling where the predicted weather conditions have an impact on the respective clientele over the scheduled time period. In some embodiments, the spatio-temporal calendar is generated through solving a multi-objective problem that includes minimal travel and maximum impact on the serviced location.

Embodiments of the spatio-temporal calendar generation as described herein may be used by a number of industries that may be impacted through weather-related conditions, including, agricultural entities, food supply chain entities, renewable energy suppliers, machinery manufacturing entities, healthcare providers, and government entities. For example, a spatio-temporal calendar may be generated for smart management of renewable energy infrastructure such as wind farms, solar farms, geothermal sites, and hydroelectric facilities. In addition, other considerations and factors may also be used to schedule service visits. For example, for healthcare providers, a spatio-temporal calendar may be generated for providing healthcare services against vector-based diseases across a large region.

In at least some embodiments described herein, for large regions with many locations of interest, grouping and clustering mechanisms may be employed to determine representative locations of interest that may facilitate a trip to a single location, but provide greater coverage due to proximity of the locations and employing communication of the information brought to the location by the service representative. Under some circumstances, the number of locations within a region may far outnumber the abilities of one user. Therefore, the systems and methods described herein may identify the appropriate number of resources to provide effective coverage of the region, and issue requests, or assignments, for additional resources to meet the need.

In at least some embodiments, the spatio-temporal calendar may include a long-term schedule, e.g., extending out to approximately one year, thereby forecasting the requirements for the respective locations of interest to plan and create future consulting and service plans. In addition, the systems and methods described herein are configured to forecast how the time-dependent factors used to generate the calendars may change in the long-term and how the clientele's activities will be affected in a given region(s).

In at least some embodiments, the systems and method for generating the spatio-temporal calendars as described herein include dynamic features that are configured to adapt the respective schedules to dynamic information that may materially impact the effectiveness and efficiencies of the service visits, for example, changes to the prevailing constraints or business needs relevant to the clientele.

In one or more embodiments, the systems and methods described herein may facilitate determinations of locations of interest that should receive a service visit that are beyond any static list of locations to visit to improve the impact performance of the users. In addition, the systems and methods described herein may also provide updated periodicities of service visits to certain locations based on the needs of the clientele and the effectiveness of prior visits.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
one or more processing devices and at least one memory device operably coupled to the one or more processing devices, the one or more processing devices are configured to:
collect information and constraints with respect to service visits, wherein at least a portion of the collected information and constraints are directed toward weather and climate comprising:
generate, through a machine learning technology, questions and raise subjects of interest for the user;
predict, through the machine learning technology, weather and climate impacts on at least one geographical region of interest;
predict, automatically, through the machine learning technology, subject to the predictions of weather and climate impacts, one or more locations of interest within the at least one geographical region of interest that would be impacted by one or more service visits;
generate, through the machine learning technology, one or more spatio-temporal calendars that include the one or more locations of interest scheduled for the one or more service visits; and
ingest, by the machine learning technology, feedback from the users, wherein, subject to ingesting the feedback, the one or more processing devices are further configured to:
evaluate the effectiveness of the generated questions and subjects of interest raised;
update the machine learning technology with respect to predictions of the one or more locations of interest: and
improve an effectiveness of the questions generated and subjects of interest raised.

2. The system of claim 1, wherein the one or more processing devices are further configured to:
identify, automatically, one or more locations of interest that have not been previously identified.

3. The system of claim 1, wherein the one or more processing devices are further configured to:
generate a spatio-temporal calendar impact metric to measure an effectiveness of the one or more spatio-temporal calendars with respect to the impact of the one or more service visits to the one or more locations of interest.

4. The system of claim 1, wherein the one or more processing devices are further configured to:
generate the one or more of questions and subjects of interest at least partially based on the predicting one or more locations of interest.

5. The system of claim 1, wherein the one or more processing devices are further configured to:
group, automatically, the one or more locations of interest into one or more clusters;
select, automatically, at least one representative location from the one or more locations of interest within the respective clusters; and
schedule the at least one representative location for a service visit through the one or more spatio-temporal calendars.

6. The system of claim 1, wherein the one or more processing devices are further configured to:
estimate, automatically, an importance of the one or more locations of interest comprising one or more of:
estimate the weather and climate impacts, based on weather and climate predictions, on the value of the service visit at any location of interest of the one or more locations of interest in a respective time period specified in the one or more spatio-temporal calendars;
estimate a current state of activity at the one or more locations of interest; and
analyze previous engagements with the one or more locations of interest.

7. The system of claim 1, wherein the one or more processing devices are further configured to:
use multi-objective optimization to determine a solution to a multi-objective problem statement that includes optimizing two objectives including minimizing travel distance and time and generating an improved spatio-temporal calendar impact on the one or more locations of interest.

8. The system of claim 1, wherein the one or more processing devices are further configured to:
generate an aggregated spatio-temporal calendar that includes a plurality of the one or more spatio-temporal calendars.

9. The system of claim 1, wherein the one or more processing devices are further configured to:
use the machine learning technology to generate predictions of the impact to the one or more locations of interest from the weather and climate predictions.

10. A computer program product, the computer program product comprising:
one or more computer readable storage media; and
program instructions collectively stored on the one or more computer-readable storage media, the program instructions comprising:
program instructions to collect information and constraints with respect to service visits, wherein at least a portion of the collected information and constraints are directed toward weather and climate comprising:
program instructions to generate, through a machine learning technology, questions and raise subjects of interest for the user;
program instructions to predict, through the machine learning technology, weather and climate impacts on at least one geographical region of interest;
program instructions to predict, automatically, through the machine learning technology, subject to the predictions of weather and climate impacts, one or more locations of interest within the at least one geographical region of interest that would be impacted by one or more service visits;
program instructions to generate, through the machine learning technology, one or more spatio-temporal calendars that include the one or more locations of interest scheduled for the one or more service visits: and
program instructions to ingest, by the machine learning technology, feedback from the users comprising:
program instructions to evaluate, subject to ingesting the feedback, the effectiveness of the generated questions and subjects of interest raised;
program instructions to update, subject to ingesting of the feedback, the machine learning technology with respect to predictions of the one or more locations of interest: and
program instructions to improve, subject to ingesting of the feedback, an effectiveness of the questions generated and subjects of interest raised.

11. The computer program product of claim 10, further comprising:
program instructions to identify, automatically, one or more locations of interest that have not been previously identified;
program instructions to generate a spatio-temporal calendar impact metric to measure an effectiveness of the one or more spatio-temporal calendars with respect to the impact of the one or more service visits to the one or more locations of interest;
program instructions to generate the one or more of questions and subjects of interest at least partially based on the prediction of one or more locations of interest; and program instructions to use the machine learning technology to generate predictions of the impact to the one or more locations of interest from the weather and climate predictions.

12. A computer-implemented method comprising:
collecting information and constraints with respect to service visits, wherein at least a portion of the collected information and constraints are directed toward weather and climate comprising:
generating, through a machine learning technology, questions and raise subjects of interest for the user;
predicting, through the machine learning technology, weather and climate impacts on at least one geographical region of interest;
predicting, automatically, through the machine learning technology, subject to the predictions of weather and climate impacts, one or more locations of interest within the at least one geographical region of interest that would be impacted by one or more service visits;
generating, through the machine learning technology, one or more spatio-temporal calendars that include the one or more locations of interest scheduled for the one or more service visits; and
ingesting, by the machine learning technology, feedback from the users, wherein, subject to the ingesting of the feedback, the method further comprising:
evaluating the effectiveness of the generated questions and subjects of interest raised;
updating the machine learning technology with respect to predictions of the one or more locations of interest: and
improving an effectiveness of the questions generated and subjects of interest raised.

13. The method of claim 12, wherein the predicting one or more geographical regions of interest comprises:
identifying, automatically, one or more locations of interest that have not been previously identified.

14. The method of claim 12, further comprising:
generating a spatio-temporal calendar impact metric to measure an effectiveness of the one or more spatio-temporal calendars with respect to the impact of the one or more service visits to the one or more locations of interest.

15. The method of claim 12, further comprising:
generating the one or more of questions and subjects of interest at least partially based on the predicting one or more locations of interest.

16. The method of claim 12, further comprising:
grouping, automatically, the one or more locations of interest into one or more clusters; and
selecting, automatically, at least one representative location from the one or more locations of interest within the respective clusters; and
scheduling the at least one representative location for a service visit through the one or more spatio-temporal calendars.

17. The method of claim 12, further comprising:
estimating an importance of the one or more locations of interest, wherein estimating the importance comprises one or more of:
estimating, automatically, the weather and climate impacts, based on weather and climate predictions, on the value of the service visit at any location of interest of the one or more locations of interest in a respective time period specified in the one or more spatio-temporal calendars;

estimating a current state of activity at the one or more locations of interest; and analyzing previous engagements with the one or more locations of interest.

18. The method of claim 12, wherein the generating one or more spatio-temporal calendars comprises:

using multi-objective optimization to determine a solution to a multi-objective problem statement that includes optimizing two objectives including minimizing travel distance and time and generating an improved spatio-temporal calendar impact on the one or more locations of interest.

19. The method of claim 12, wherein the generating one or more spatio-temporal calendars comprises:

generating an aggregated spatio-temporal calendar that includes a plurality of the one or more spatio-temporal calendars.

20. The method of claim 12, wherein the predicting one or more locations of interest comprises:

using the machine learning technology to generate predictions of the impact to the one or more locations of interest from the weather and climate predictions.

* * * * *